(12) United States Patent
Reinsperger et al.

(10) Patent No.: US 11,994,188 B2
(45) Date of Patent: May 28, 2024

(54) VISCOUS TORSIONAL-VIBRATION DAMPER AND METHOD FOR PRODUCING A VISCOUS TORSIONAL-VIBRATION DAMPER

(71) Applicant: Hasse & Wrede GmbH, Berlin (DE)

(72) Inventors: Nobert Reinsperger, Hoppegarten (DE); Michael Steidl, Berlin (DE)

(73) Assignee: Hasse & Wrede GmbH, Berlin (DE)

( * ) Notice: Subject to any disclaimer, the term of this patent is extended or adjusted under 35 U.S.C. 154(b) by 519 days.

(21) Appl. No.: 17/288,295

(22) PCT Filed: Oct. 21, 2019

(86) PCT No.: PCT/EP2019/078602
§ 371 (c)(1),
(2) Date: Apr. 23, 2021

(87) PCT Pub. No.: WO2020/083846
PCT Pub. Date: Apr. 30, 2020

(65) Prior Publication Data
US 2021/0381580 A1  Dec. 9, 2021

(30) Foreign Application Priority Data
Oct. 24, 2018  (DE) .................... 10 2018 126 471.2

(51) Int. Cl.
*F16F 15/173* (2006.01)
*F16F 15/00* (2006.01)

(52) U.S. Cl.
CPC ........ *F16F 15/173* (2013.01); *F16F 2222/08* (2013.01); *F16F 2222/12* (2013.01); *F16F 2224/0208* (2013.01); *F16F 2226/048* (2013.01); *F16F 2232/02* (2013.01); *F16F 2234/02* (2013.01); *F16F 2236/08* (2013.01)

(58) Field of Classification Search
CPC .................................................... F16F 15/173
See application file for complete search history.

(56) References Cited

U.S. PATENT DOCUMENTS

| 4,872,369 A | 10/1989 | Critton et al. |
| 5,058,453 A | 10/1991 | Graham et al. |
| (Continued) |

FOREIGN PATENT DOCUMENTS

| CN | 202065409 U | 12/2011 |
| CN | 202182144 U | 4/2012 |
| (Continued) |

OTHER PUBLICATIONS

International Search Report (PCT/ISA/210) issued in PCT Application No. PCT/EP2019/078602 dated Jan. 23, 2020 with English translation (five (5) pages).

(Continued)

*Primary Examiner* — Melody M Burch
(74) *Attorney, Agent, or Firm* — Crowell & Moring LLP (57) ABSTRACT

A viscous torsional-vibration damper has a damper housing with an axis of rotation, an annular working chamber filled with a damping medium, an inertia ring arranged inside the working chamber, and a cover for media-tight closure of the working chamber. The cover is connected to the damper housing peripherally on one side by a sequence of a butt seam and an overlap seam.

16 Claims, 4 Drawing Sheets

(56) References Cited

U.S. PATENT DOCUMENTS

2002/0170908 A1* 11/2002 Lylykangas ........... F01N 3/2842
219/617
2018/0328408 A1   11/2018 Knopf

FOREIGN PATENT DOCUMENTS

| | | |
|---|---|---|
| CN | 203453380 U | 2/2014 |
| CN | 108474445 A | 8/2018 |
| DE | 1 775 390 A1 | 9/1971 |
| DE | 2714230 A1 * | 10/1978 |
| DE | 693 08 205 T2 | 6/1997 |
| DE | 102008063015 A1 * | 7/2010 ............ F16F 15/165 |
| EP | 0 620 380 A1 | 10/1994 |
| JP | 6-159444 A | 6/1994 |
| KR | 890004103 A | 4/1989 |
| WO | WO 96/41974 A1 | 12/1996 |
| WO | WO 2017/085048 A1 | 5/2017 |
| WO | WO-2018019729 A1 * | 2/2018 .......... F16F 15/1442 |

OTHER PUBLICATIONS

German-language Written Opinion (PCT/ISA/237) issued in PCT Application No. PCT/EP2019/078602 dated Jan. 23, 2020 (five (5) pages).
German-language Office Action issued in German Application No. 10 2018 126 471.2 dated Apr. 26, 2019 (eight (8) pages).
Chinese-language Office Action issued in Chinese Application No. 201980070067.3 dated Mar. 21, 2022 with English translation (eleven pages).
Cover Page of EP 3 377 785A1 published Sep. 26, 2018 (one (1) page).

\* cited by examiner

VISCOUS TORSIONAL-VIBRATION DAMPER AND METHOD FOR PRODUCING A VISCOUS TORSIONAL-VIBRATION DAMPER

BACKGROUND AND SUMMARY OF THE INVENTION

The present invention relates to a viscous torsional-vibration damper and to a method for the production thereof.

Torsional-vibration dampers of the type in question are used on a machine shaft—frequently an engine crankshaft—to damp torsional vibrations. On the machine shaft, the damper housing of the torsional-vibration damper is connected in a torsionally rigid manner to a machine shaft—frequently an engine crankshaft—whose torsional vibrations are to be damped. The damper housing and the inertia ring follow the mean rotational speed of the machine shaft without slippage. On the other hand, their torsional vibrations, which are superimposed on the uniform rotation, are initially transmitted only to the damper housing. The inertia ring would rotate uniformly if it were not coupled to the damper housing by a viscous fluid—e.g. a silicone oil—which fills the narrow shear gap. This coupling is elastic and subject to damping. As a result, relative rotational angles of, for example, up to ±1 angular degree occur between the damper housing and the inertia ring in synchronism with the exciting shaft vibration. Since the inertia ring can therefore rotate somewhat relative to the damper housing in the damper housing chamber, it generally requires for its mounting at least one bearing device, which has one or more bearing elements.

DE 693 08 205 T2 and CN 203 453 380 U each disclose a viscous torsional-vibration damper comprising an annular plate-shaped cover. This cover is welded with a lap seam and/or a butt seam remote from the lap seam. Mutual interactions between the two seams to increase strength are, however, marginal in this arrangement.

U.S. Pat. No. 5,058,453 A discloses a variant in which the cover of a viscous vibration damper is connected on one side, in this case at the radially inner edge region of the working chamber, with a welded-through lap seam, and in which the cover is welded with a butt seam on the other side of the working chamber, that is to say in the radially outer region of the working chamber.

Typically, the abovementioned inertia ring is mounted in a working chamber of the damper housing, which chamber is filled with damping medium and can be closed by a cover. The cover is typically welded in a medium-tight manner, and therefore the damping medium cannot escape. However, owing to axial vibrations of the shaft, the cover is subjected by the inertia ring to transverse vibrations, which ultimately have an effect on the weld seam. In the case of elastic or plastic deformation of the cover, the weld seam may thus be stressed, in particular subjected to bending stresses, and, depending on the design of the machine shaft and the associated machine, the weld seam may even fail under high forces.

Proceeding from the abovementioned preliminary consideration, it is the object of the present invention to produce a connection between the cover and the damper housing of a viscous torsional-vibration damper which can be produced at low cost and is capable of bearing higher loads.

The present invention solves this problem by means of a viscous torsional-vibration damper and by means of a method for producing a viscous torsional-vibration damper having the features of the independent claims.

A viscous torsional-vibration damper according to the invention comprises a damper housing having an axis of rotation. This damper housing has an annular working chamber filled with a damping medium.

An inertia ring is arranged inside the working chamber. A cover serves for medium-tight closure of the working chamber.

The viscous vibration damper according to the invention is distinguished by the fact the cover is connected to the damper housing circumferentially on one side by a sequence of a butt seam and a lap seam.

The cover is preferably designed as an annular plate. It has an outer edge region and an inner edge region. The cover can be of single-part or multi-part construction. At a first of the two edge regions, the cover can be clamped or welded to the damper housing and rest on the damper housing. The sequence of a butt seam and a lap seam can be arranged at a second of the two edge regions. Advantageously, however, it is also possible for the cover to be welded with a double seam or lap seam in both edge regions. A lap seam is particularly suitable when the cover rests flush or on top of the damper housing and thus a cover receptacle is provided. The two seams are preferably formed circumferentially and are arranged concentrically to one another. However, it is also possible that only one of the two seams is circumferential and assumes a sealing function for closing the working chamber and the other seam is provided merely for mechanical connection or for torque support between the cover and the damper housing.

Further advantageous embodiments of the invention form the subject matter of the dependent claims.

For better anchoring of the cover in the damper housing, the damper housing can have a stepped cover receptacle.

The cover can preferably be of annular design with an inner surface in contact with the damping medium and an outer surface, opposite the inner surface, without contact with the damping medium.

The cover can have a first and second circumferential end surface on the edges of the inner and outer surface, in particular between these two surfaces, wherein the end surfaces are each connected to the cover receptacle by a butt seam.

The arrangement of butt seams on both sides permits optimum torque absorption and at the same time a sealing function of the cover.

The butt seams are preferably designed as non-welded-through weld seams. They preferably extend over less than 80% of a cover height of the cover, wherein the cover height to which reference is made here is the cover height in the region of the respective butt seam. This has the advantage that there is a defined sealing geometry at the transition region of the end surfaces to the inner surfaces of the cover.

The lap seam can extend as a welded-through weld seam over the entire cover height of the cover and extend partially into the damper housing. The depth to which the lap seam extends into the damper housing is preferably at least 15% of the cover height, wherein the cover height to which reference is made here is the cover height in the region of the respective lap seam. As a particular preference, the depth can correspond to 40 to 120% of the cover height.

The lap seam can advantageously be arranged offset in the radial direction by 2-7 mm relative to the butt seam. As a result, there is no fusion of the weld seams, and the partial heat input during the production of the weld seams takes place in spatially separated material regions. Furthermore, the distance between the two weld seams results in a defined leverage, by means of which the lap seam is relieved of mechanical loads. The lap seam is subjected less to bending stress and more to tension by virtue of the torque support by the butt seam. Since the bending stresses which occur are significantly higher than the tensile stresses which occur, the seam is relieved of loads, and the seam does not fail until the axial acceleration of the damper is significantly higher.

The radial distance between the position of the lap seam on a supporting surface of the cover receptacle of the damper housing and the transition of the supporting surface to the working chamber can preferably amount to at least 50% of the cover height, preferably at least 70% of the cover height, in particular 75% to 250% of the cover height.

The damper housing can advantageously be made of cast metal, in particular of grey cast iron. Particularly in combination with the abovementioned design features of the respective weld seams, the use of this inexpensive material has the advantage that a material change in the grey cast iron due to the weld seams is of only a locally limited nature and hardly affects the leaktightness of the material.

A method according to the invention for producing a viscous torsional-vibration damper, in particular a torsional-vibration damper according to the invention, has the following steps:

a) providing a damper body comprising an annular working chamber for receiving an inertia ring via a chamber opening;
b) inserting the inertia ring into the working chamber of the damping body;
c) closing the working chamber of the damping body with a cover by at least one medium-tight circumferential welded joint; and
d) filling the working chamber with a damping medium, e.g. through a closable filling opening in the cover.

Here, the method is distinguished, in particular, by the fact that the welded joint is effected at least in an edge region of the cover by a sequence of a butt seam and a lap seam.

The abovementioned butt seam and the lap seam, and optionally also all further weld seams, can be produced by laser and/or electron beam welding, which are material-friendly methods with very exact positioning of the weld seams.

Further advantages, features and details of the invention will be found in the following description, in which an exemplary embodiment of the invention is explained in greater detail with reference to the drawing. A person skilled in the art will expediently also consider the features disclosed in combination in the drawing, the description and the claims individually and combine them into worthwhile further combinations.

DETAILED DESCRIPTION OF THE DRAWINGS

Figure 1:
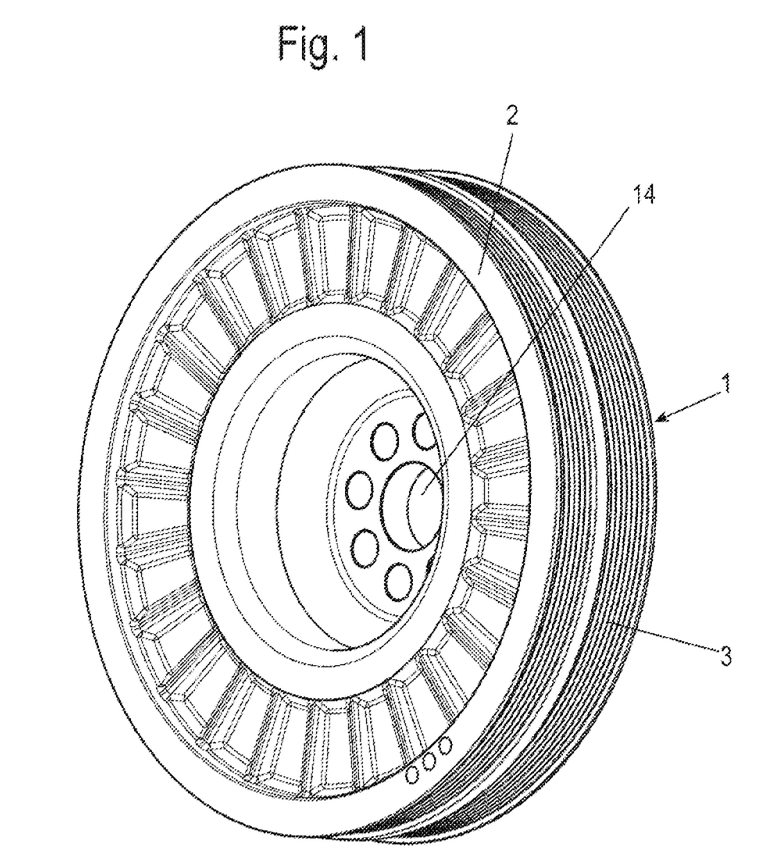
FIG. 1 shows a perspective view of a first embodiment variant of an annular viscous torsional-vibration damper.

Specifically, FIG. 1 shows a viscous torsional-vibration damper 1 having a damper housing 2, which has a central opening 14 for attachment to a machine shaft.

Figure 2:
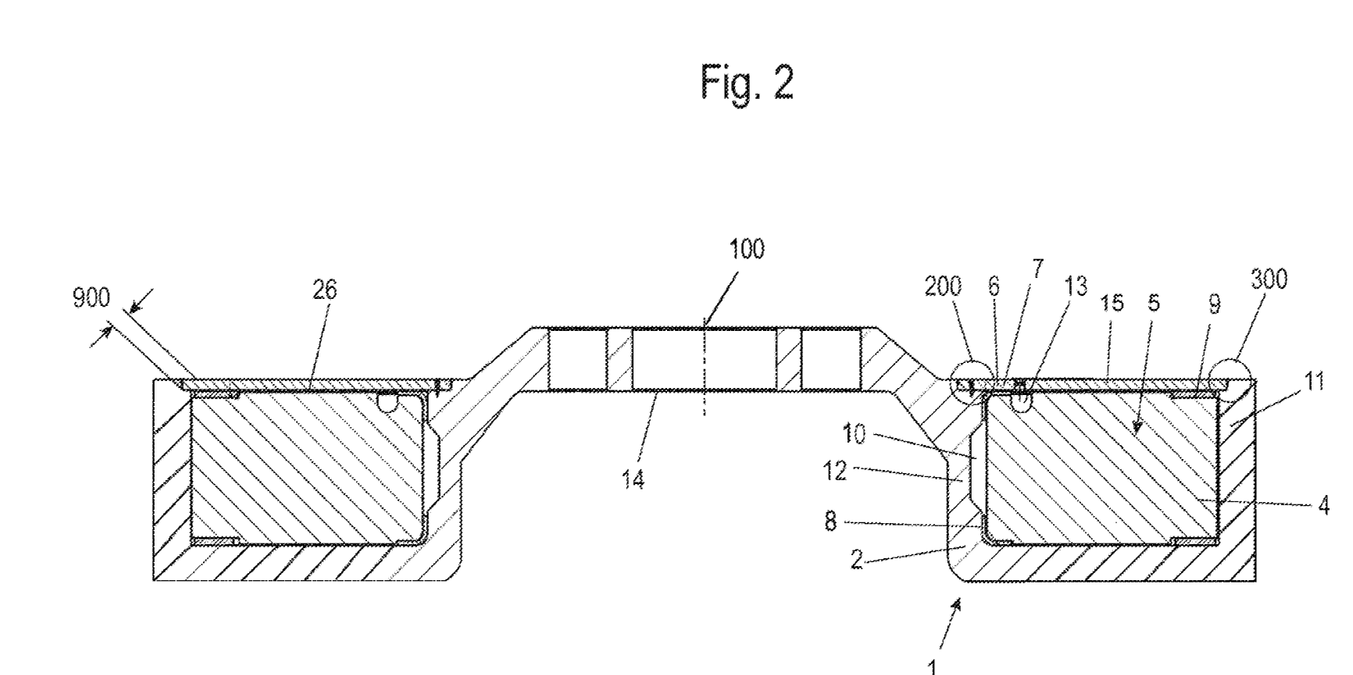
FIG. 2 shows a sectional view through a ring half of the viscous torsional-vibration damper of FIG. 1.

FIG. 2 shows an axis of rotation 100 which extends centrally through the central opening 14 and about which the viscous torsional-vibration damper 1 is rotatably arranged.

The damper housing 2 of the viscous torsional-vibration damper 1 has a first wall with a radial inner lateral surface 12 and a second wall, preferably extending parallel to the first wall, with a radial outer lateral surface 11. A working chamber 5 for arranging an inertia ring 4 is arranged between the outer and inner lateral surfaces 11 and 12 and thus also between the illustrated first and second walls. The inertia ring 4 can be mounted inside the working chamber 5 by means of bearing elements and can be inserted into the working chamber 5 via a chamber opening 26.

A shear gap 10 is arranged between the inner lateral surface 12 and the inertia ring 4. After the inertia ring 4 has been inserted into the working chamber 5, the working chamber 5, in particular the chamber opening 26, is closed with a cover 15 and filled with a damping medium, e.g. silicone oil. Thus, inter alia, the shear gap 10 is filled with silicone oil. For filling the working chamber 5, the cover 15 can have a closable filling opening at the level of the recess 13.

The cover 15 has a cover height 900 and is preferably connected to the damper housing 2 by welding, whereby the working chamber 5 is sealed in a medium-tight manner. In this case, the cover 15 is of substantially annular construction and has an outer surface 19, the surface normal of which extends parallel to the axis of rotation 100.

On the edges, preferably perpendicular to the outer surface 19, the cover has an inner and an outer end surface 20 and 23 which, in a stepped cover receptacle of the damper housing, lie opposite an end surface 24 and 25 of the damper housing 2. This is illustrated especially in FIG. 3. The terms inner and outer end surface 20 and 23 each relate to the radial spacing of the end surfaces with respect to the axis of rotation 100.

Figure 3:
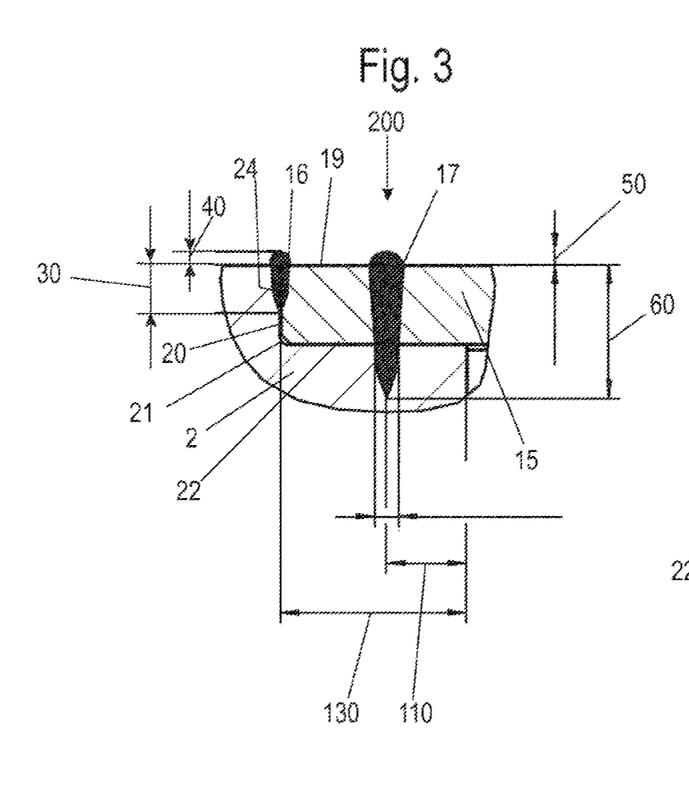
FIG. 3 shows a detail view of a first connection region 200 between a cover 15 and a damper housing 2 of FIG. 2.

The inner end surface 20 of the cover 15 and the end surface 24 of the cover receptacle of the damper housing 2 define a circumferential interface in the form of a butt joint. Along this interface, a first weld seam, which is not welded through, is arranged as a butt seam 16 and extends between the two abovementioned end surfaces 20 and 24.

The depth 30 of the butt seam 16 is limited. The cover has a chamfer 21 at the transition between the end surface 20 and an inner surface 22 situated opposite the outer surface 19. As an alternative to the chamfer 21, it is also possible for a relief notch to be provided in the housing. The butt seam 16 at least does not extend into the region of this chamfer. For example, the butt seam 16 extends over less than 80% of the cover height, preferably less than 65% of the cover height.

The cover height of the above-described cover is preferably less than 7 mm, particularly preferably between 2-4 mm.

A second weld seam in the form of what is referred to as a lap seam 17 is arranged offset in the radial direction by approximately 1-7 mm relative to the butt seam 16. The lap seam 17 penetrates the material of the cover 15 and penetrates partially into the material of the damper housing 2. Thus, the lap seam is welded through.

Starting from the inner surface 22 of the cover 15, the lap seam 17 extends into the damper housing 2 by a depth 60 of at least 15% of the cover height.

The cover receptacle has a first supporting surface, on which the inner surface 22 of the cover 15 rests. Starting from the end surface 24, this supporting surface extends radially away from the axis of rotation in the direction of the working chamber 5. The radial extent 130 of the supporting surface amounts to more than one cover height, preferably 1.5 to 5 cover heights.

The radial distance 130 between the position of the lap seam 17 on the supporting surface and the transition of the supporting surface to the working chamber 5 amounts to at least 50% of the cover height, preferably at least 70% of the cover height. In this context, the position of the lap seam 17 is the center of the lap seam in section, as can also be seen from FIG. 3.

Figure 4:
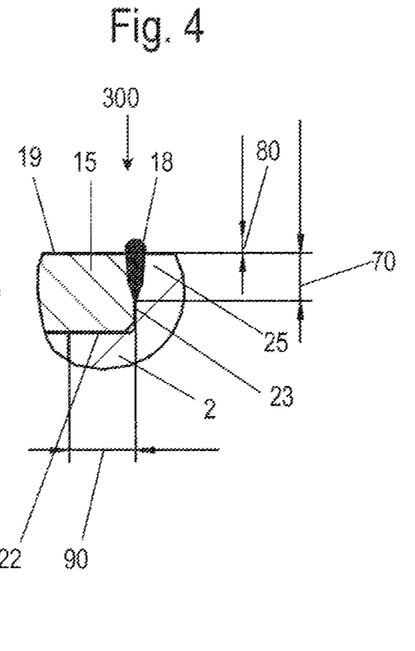
FIG. 4 shows a detail view of a second connection region 300 between the cover 15 and the damper housing 2 of FIG. 2.

FIG. 4 shows the interface between the outer end surface 23 of the cover 15 and a second end surface 25 of the cover receptacle of the damper housing 2. A non-welded-through weld seam in the form of a butt seam 18 has been provided here. In this case, the cover receptacle has a second supporting surface, which, starting from the second end surface 25, has a radial extent 90 up to the transition to the chamber 5. This amounts to at least 25% of the cover height, preferably at least 50% of the cover height.

The arrangement of cover and damper housing illustrated in FIG. 4 is only an example, and thus it is also possible, for example, for the cover to be placed on top of the damper housing, for example, and embodied with a lap seam.

Alternatively, a weld seam configuration consisting of a butt seam and a lap seam can be chosen, as in FIG. 3.

The sequence of the butt seam 16 and the lap seam 17 for fixing the cover 15 at the edge in a cover receptacle of the damper housing 2 makes it possible to fix the cover and at the same time to provide torque support for the lap weld seam when the cover 15 is subjected to pressure and/or when there are axial vibrations on the viscous torsional-vibration damper 1. These axial vibrations are typically transmitted to the damper housing from a front end of the crankshaft. Due to the inertia of the inertia ring, the inertia ring presses on the cover during acceleration of the housing and thus imposes a load on the weld seam. Here, the butt seam 16 and the lap seam 17 serve for the unilateral circumferential closure of the cover 15 on the inside diameter of the chamber. On the second side of the cover, that is to say along the second end surface 23, it is possible, for example, to arrange only a butt seam 18 or a lap seam.

Of course, it is also possible to arrange both a lap seam and a butt seam along the second end surface. If this is the case, the lap seam 17 can optionally be omitted.

The fatigue strength of the weld seams of the viscous torsional-vibration damper 1 embodied particularly in FIG. 3 are significantly higher with this weld seam arrangement since the lap seam is subjected more to tension and less to bending.

The abovementioned weld seams 16-18 can preferably be implemented by laser or electron beam welding. Comparatively small and at the same time exactly positioned weld seams can thereby be produced.

The damper housing 2 can typically be made of a cast metal, in particular of a grey cast iron. The cover can be manufactured from any metal, but preferably from stainless steel, in particular in combination with the grey cast iron damper housing.

Material properties of grey cast iron may change in an undesirable way during prolonged welding. Therefore, a compromise is to be found, particularly also in respect of the depth and width of weld seams 16-18, between optimum connection, support and, at the same time, material-friendly production, and this compromise has been achieved with the respective abovementioned range specifications.

Figure 5:
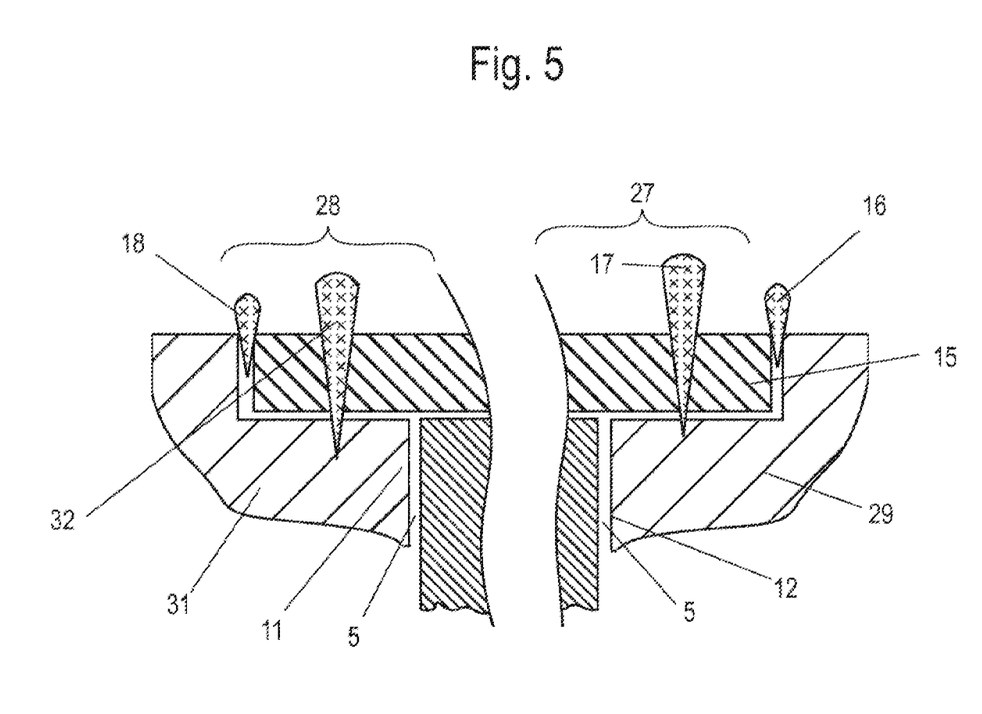
FIG. 5 shows a detail view of a second embodiment variant of an annular viscous torsional-vibration damper.

FIG. 5 shows a detail of a second embodiment variant, in which, in the right-hand illustration (analogous to FIGS. 1-4), a radially inner edge region of the cover 15 is welded circumferentially by means of an inner first end face of the cover 15, via a butt seam 16, by means of one end face to a first wall 29 of the damper housing 2, said first wall delimiting the working chamber 5. The wall is additionally connected to the first wall 29 by a welded-through lap seam 17.

FIG. 5 shows an analogous sequence of a lap seam 17 and a butt seam 18 for connecting the outer second end face of the cover 15 to a second wall 31 of the damper housing 2. The walls 29 and 31 delimit the working chamber 5, lie opposite one another and can particularly preferably extend coaxially to one another. The first end face of the cover 15 has a smaller diameter than the second end face of the cover 15.

In other words, the viscous torsional-vibration damper in FIG. 5 has a first wall 29 with an inner lateral surface 12 and a second wall 31 with an outer lateral surface 11, wherein the working chamber 5 is arranged between the two abovementioned surfaces 11 and 12 and thus also between the two walls 29 and 31, wherein the sequence of a lap seam 32 and a butt seam 18 is arranged in a radially outer edge region 28 of the cover 15, wherein both weld seams 18 and 32 connect the cover 15 to the first wall 31 comprising the outer lateral surface 11.

Furthermore, the viscous torsional-vibration damper in FIG. 5 has a first wall 29 with an inner lateral surface 12 and a second wall 31 with an outer lateral surface 11, wherein the working chamber 5 is arranged between the two abovementioned surfaces 11 and 12 and thus also between the two walls 29 and 31, wherein the sequence of a lap seam 17 and a butt seam 16 is arranged in a radially inner edge region 27 of the cover 15, wherein both weld seams 16 and 17 connect the cover 15 to the first wall 29 comprising the inner lateral surface 11.

Accordingly, there is a sequence of a butt seam and a lap seam in each edge region in which the two end faces of the cover are welded to in each case one of the two abovementioned walls via a double seam and are connected to it in a materially bonded manner. In this embodiment variant, the cover is thus connected on both sides, that is to say along both end faces, to the damper housing by the sequence of a butt seam and a lap seam.

As can already be seen from FIGS. 1 and 2, the walls 29 and 31, which are not labeled in FIGS. 1 and 2, have the outer lateral surface 11 and the inner lateral surface 12. Therefore, the association of the walls is also evident in the exemplary embodiment of FIGS. 1-4.

REFERENCE SIGNS

1 Viscous torsional-vibration damper
2 Damper housing
4 Inertia ring
5 Working chamber
11 Outer lateral surface
12 Inner lateral surface
14 Central opening
15 Cover
16 Butt seam
17 Lap seam
18 Butt seam
19 Outer surface
20 End surface
21 Chamfer
22 Inner surface
23 End surface 24 End surface
25 End surface
26 Chamber opening
27 Radially inner edge region
28 Radially outer edge region
29 First wall
31 Second wall
32 Lap seam
30 Depth
60 Depth
70 Depth
90 Radial extent
110 Radial distance
130 Radial extent
100 Axis of rotation
900 Cover height

What is claimed is:

1. A viscous torsional-vibration damper, comprising:
a damper housing having an axis of rotation and an annular working chamber filled with a damping medium;
an inertia ring arranged inside the working chamber; and
a cover for medium-tight closure of the working chamber, wherein
the cover is connected to the damper housing circumferentially at least on one side by a sequence of a butt seam and a lap seam, and
the lap seam is arranged offset in a radial direction by 1-7 mm relative to the butt seam, wherein
the viscous torsional-vibration damper has a first wall with an inner lateral surface and a second wall with an outer lateral surface,
the working chamber is arranged between the inner and outer lateral surfaces and thereby also between the first and second walls, and
the sequence of a lap seam and a butt seam is arranged in a radially inner edge region of the cover, wherein both weld seams connect the cover to the first wall comprising the inner lateral surface.

2. A viscous torsional-vibration damper, comprising:
a damper housing having an axis of rotation and an annular working chamber filled with a damping medium;
an inertia ring arranged inside the working chamber; and
a cover for medium-tight closure of the working chamber, wherein
the cover is connected to the damper housing circumferentially at least on one side by a sequence of a butt seam and a lap seam, and
the lap seam is arranged offset in a radial direction by 1-7 mm relative to the butt seam, wherein
the viscous torsional-vibration damper has a first wall with an inner lateral surface and a second wall with an outer lateral surface,
the working chamber is arranged between the inner and outer lateral surfaces and thereby also between the first and second walls, and
the sequence of a lap seam and a butt seam is arranged in a radially outer edge region of the cover, wherein both weld seams connect the cover to the first wall comprising the outer lateral surface.

3. The viscous torsional-vibration damper as claimed in claim 1, wherein
the cover is an annular plate with a radially outer and a radially inner edge region, and
the cover is connected circumferentially to the damper housing in the outer edge region and in the inner edge region in each case by a sequence of a butt seam and a lap seam.

4. The viscous torsional-vibration damper as claimed in claim 2, wherein
the cover is an annular plate with a radially outer and a radially inner edge region, and
the cover is connected circumferentially to the damper housing in the outer edge region and in the inner edge region in each case by a sequence of a butt seam and a lap seam.

5. The viscous torsional-vibration damper as claimed in claim 1, wherein
the damper housing has a stepped cover receptacle,
the cover is of annular design with an inner surface in contact with the damping medium and an opposite outer surface without contact with the damping medium,
the cover has a first and second circumferential end surface on edges of the inner and outer surface, wherein the first and second end surfaces are connected to the cover receptacle in each case by a butt seam.

6. The viscous torsional-vibration damper as claimed in claim 1, wherein
the damper housing is connected to the cover mounted on top,
the cover is of annular design with an inner surface in contact with the damping medium and an opposite outer surface without contact with the damping medium, and
the cover is welded to the damper housing in edge regions of the inner and outer surfaces in each case by a lap seam.

7. The viscous torsional-vibration damper as claimed in claim 1, wherein
the butt seam is designed as a non-welded-through weld seam, forming less than 80% of a cover height of the cover.

8. The viscous torsional-vibration damper as claimed in claim 7, wherein
the lap seam extends as a welded-through weld seam over an entire cover height of the cover and extends partially into the damper housing, with a depth of at least 30% of the cover height into the damper housing.

9. The viscous torsional-vibration damper as claimed in claim 1, wherein
the lap seam extends as a welded-through weld seam over an entire cover height of the cover and extends partially into the damper housing, with a depth of at least 30% of the cover height into the damper housing.

10. The viscous torsional-vibration damper as claimed in claim 1, wherein
a radial distance between the position of the lap seam on a supporting surface of a cover receptacle of the damper housing and the transition of the supporting surface to the working chamber amounts to at least 50% of the cover height.

11. The viscous torsional-vibration damper as claimed in claim 1, wherein
a radial distance between the position of the lap seam on a supporting surface of a cover receptacle of the damper housing and the transition of the supporting surface to the working chamber amounts to at least 70% of the cover height.

12. The viscous torsional-vibration damper as claimed in claim 1, wherein a radial distance between the position of the lap seam on a supporting surface of a cover receptacle of the damper housing and the transition of the supporting surface to the working chamber amounts to at least 75% to 250% of the cover height.

13. The viscous torsional-vibration damper as claimed in claim 1, wherein
the damper housing is made of cast metal.

14. The viscous torsional-vibration damper as claimed in claim 1, wherein
the damper housing is made of grey cast iron.

15. A method for producing a viscous torsional-vibration damper, the method comprising:
   a) providing a damper body comprising an annular working chamber for receiving an inertia ring via a chamber opening;
   b) inserting the inertia ring into the working chamber of the damping body;
   c) closing the working chamber of the damping body with a cover by at least one medium-tight circumferential welded joint; and
   d) filling the working chamber with a damping medium, wherein
the welded joint is, at least in an edge region of the cover, carried out by a sequence of a butt seam and a lap seam, and
the lap seam is arranged offset in a radial direction by 1-7 mm relative to the butt seam,
the viscous torsional-vibration damper has a first wall with an inner lateral surface and a second wall with an outer lateral surface,
the working chamber is arranged between the inner and outer lateral surfaces and thereby also between the first and second walls, and
the sequence of a lap seam and a butt seam is arranged in a radially inner edge region of the cover, wherein both weld seams connect the cover to the first wall comprising the inner lateral surface.

16. The method as claimed in claim 15, wherein
the butt seam and the lap seam are produced by laser and/or electron beam welding.

\* \* \* \* \*